US010696379B2

(12) United States Patent
Roussey (10) Patent No.: US 10,696,379 B2
(45) Date of Patent: Jun. 30, 2020

(54) FORCE SENDING DEVICE AND A FLIGHT CONTROL DEVICE COMPRISING SUCH A FORCE SENSING DEVICE

(71) Applicant: LORD Solutions France, Pont de l'Isere (FR)

(72) Inventor: Bastien Roussey, Tain l'Hermitage (FR)

(73) Assignee: Lord Corporation, Cary, NC (US)

( * ) Notice: Subject to any disclaimer, the term of this patent is extended or adjusted under 35 U.S.C. 154(b) by 352 days.

(21) Appl. No.: 15/911,152

(22) Filed: Mar. 4, 2018

(65) Prior Publication Data
US 2018/0251208 A1 Sep. 6, 2018

(30) Foreign Application Priority Data
Mar. 6, 2017 (FR) ........................................ 1751803

(51) Int. Cl.
| | | |
|---|---|---|
| *F01D 7/00* | (2006.01) |
| *B64C 13/04* | (2006.01) |
| *F16H 25/22* | (2006.01) |
| *G01L 5/22* | (2006.01) |
| *F16H 21/44* | (2006.01) |
| *B64C 13/10* | (2006.01) |
| *F16H 25/20* | (2006.01) |

(52) U.S. Cl.
CPC .............. *B64C 13/04* (2013.01); *B64C 13/10* (2013.01); *F16H 21/44* (2013.01); *F16H 25/2204* (2013.01); *G01L 5/223* (2013.01); *F16H 2025/204* (2013.01); *F16H 2025/2028* (2013.01)

(58) Field of Classification Search
CPC . B64C 13/04; B64C 13/10; F16H 2025/2028; F16H 2025/204; F16H 21/44; F16H 25/2204
See application file for complete search history.

(56) References Cited

U.S. PATENT DOCUMENTS

| 2011/0033297 A1* | 2/2011 | Bouru ................... F04D 29/563 |
| | | 416/147 |
| 2014/0260722 A1* | 9/2014 | Kopp ....................... F16H 21/44 |
| | | 74/68 |

FOREIGN PATENT DOCUMENTS

| JP | 2948153 B2 | 9/1999 |
| WO | WO2006/018027 A2 | 2/2006 |

OTHER PUBLICATIONS

French Patent Application 17 51803, Rapport de Recherche Préliminaire, Nov. 21, 2017, 1 page.

* cited by examiner

*Primary Examiner* — Muhammad S Islam (57) ABSTRACT

A flight control device of an aircraft including a support, an action member attached to the support rotating freely around a primary axis, a rotary device including a stator, rotatably connected to the support around a secondary axis, and a rotor rotating freely relative to the stator around the secondary axis, the rotary device applying a force sensing torque on the rotor relative to the stator around the secondary axis, and a mechanical reducing gear, which connects, with a reduction ratio, rotation of the action member with rotation of the rotor, the mechanical reducing gear including a screw-nut system with rolling elements, including a screw, attached to the rotor, connected in rotation to the rotor around the secondary axis, and a nut fixed in rotation around the secondary axis relative to the stator and helically connected with the screw around and along the secondary axis via the rolling elements.

17 Claims, 7 Drawing Sheets

FORCE SENDING DEVICE AND A FLIGHT CONTROL DEVICE COMPRISING SUCH A FORCE SENSING DEVICE

CROSS REFERENCE TO RELATED APPLICATIONS

This application claims priority under 35 USC § 119 of French Patent Application No. 17 51803 filed on Mar. 6, 2017.

FIELD OF THE INVENTION

The present invention relates to a force sensing device and a flight control device comprising such a force sensing device.

The present invention more particularly relates to the field of aircraft flight control devices. More specifically, the invention relates to the manual controls situated in the man-machine interface of an aircraft. These controls can for example be actuated using a hand or a foot.

BACKGROUND OF THE INVENTION

It is known to equip a flight control device with a force sensing device, the latter being designed to apply forces on the flight control device, so as to produce a sensation for the pilot.

A first known type of force sensing device, which can be described as "force-feedback device", is designed to apply, on the flight control device, forces connected to actual phenomena acting on the device being piloted by the control device. For example, forces applied on a control surface of the wing can lead to the production of torque on the control member of that wing, using the force-feedback device.

A second known type of force sensing device, which can be described as "artificial sensing device", is designed to apply, on the flight control device, forces not directly connected to phenomena acting on the aircraft. For example, an artificial sensing device can simply apply a force sensing torque on the flight control device, in particular to compensate for an oscillating torque phenomenon between the aircraft and the pilot (also called pilot-induced oscillations, or PIO). It is also possible to provide an artificial sensing device that is able to apply an artificial vibration, or a notching sensation, when the control device is moved, in order to inform the pilot that a particular event has occurred during piloting of the aircraft.

To generate the forces producing the sensations for the pilot via the flight control member, these force sensing devices comprise a rotating device for generating the sensation. The rotating device can be active, such as a four-quadrant motor; semi-active, such as a magnetic-rheological powder device; or passive, such as a generator, a nonpowered brushless motor, or a hydraulic rotary shock absorber.

In light of the significant forces required to provide a sensation perceptible by the pilot, the flight control member is mechanically connected to the rotary device generating the sensation via a mechanical reducing gear. Based on the application, the mechanical reducing gear has a reduction ratio comprised between 50 and 200. If a shock absorber is simulated, the shock absorption coefficient produced by the rotary device on the pilot's control member is multiplied by a factor comprised between 2500 and 40,000, for this reduction ratio range.

The application of such a mechanical reduction to an aircraft flight control device requires the mechanical reducing gear to generate particularly low friction, while having a particularly high efficiency. Furthermore, it is necessary for the play to be as small as possible, optionally zero, in order to guarantee appropriate precision and piloting comfort. Furthermore, it is necessary for the control to be gentle; i.e., for the friction and the efficiency to be constant and free of any undulation over the entire travel of the control device. These requirements must be satisfied for a relatively broad operating temperature range, for example between −40° C. (degrees Celsius) and 60° C. Indeed, the range relative to flight control devices is singularly demanding, not only due to the relative constraints of the aeronautics field, but also because it is necessary to ensure perfect control ergonomics for the pilot, who acts with great precision and sensitivity on the flight controls. The pilot will experience any defect existing within the mechanical reducing gear very quickly, where such a reducing gear could have been perfectly appropriate for other applications.

In the known devices, the mechanical reducing gear is generally made up of a gear train, which generally does not make it possible to meet all of the aforementioned requirements, some of which are antagonistic, namely the absence of friction and the absence of play.

SUMMARY OF THE DESCRIPTION

The invention therefore aims to resolve the drawbacks of the prior art by proposing a force sensing device for a flight control device of an aircraft for which both the play and friction are particularly low, or even nonexistent, and a high mechanical efficiency, at a reasonable cost.

The invention relates to a force sensing device for a flight control device for an aircraft, the force sensing device comprising:
  a support,
  an action member, which is attached to the support while rotating freely around a primary axis,
  a rotary device, comprising a stator, which is attached to the support while being rotatably connected to the support around a secondary axis, and a rotor, which is attached to the stator while rotating freely relative to the stator around the secondary axis, the rotary device being designed to apply a force sensing torque on the rotor, relative to the stator, around the secondary axis, and
  a mechanical reducing gear, which, with a reduction ratio, links the rotation of the action member relative to the support around the primary axis, with the rotation of the rotor relative to the stator around the secondary axis, and which comprises a screw-nut system with rolling elements, the screw-nut system comprising:
    a screw, which is attached to the rotor while being connected in rotation to the rotor around the secondary axis, and
    a nut, which is fixed in rotation around the secondary axis relative to the stator and which is helically connected with the screw around and along the secondary axis, via the rolling elements.

One idea at the base of the invention is to provide a transmission of the movement between the action member and the rotary device through rolling contacts, owing to the implementation of the mechanical reducing gear with a screw-nut system with rolling elements. By providing a transmission, preferably exclusively, by rolling contacts, the mechanical reducing gear thus has a particularly low, or even nonexistent, play and friction, and a high mechanical efficiency, relative to a traditional reducing gear with gear train. In the invention, one thus converts the rotating movement of the action member relative to the support into a translational movement of the nut relative to the stator along the secondary axis, then this translational movement into a rotational movement of the screw and the rotor relative to the stator, around the secondary axis. The implementation of a screw-nut system, rather than a gear train, further makes the force sensing device less sensitive to temperature variations. The implementation of such a screw-nut system makes it possible to obtain the aforementioned effects and advantages while having a reasonable cost, inasmuch as such a screw-nut system is inherently relatively inexpensive compared to other systems with rolling elements that are more elaborate and less standard.

According to other optional and advantageous features of the invention:

the mechanical reducing gear comprises a connecting rod connecting the action member to the nut, the connecting rod being attached to the action member such that the connecting rod rotates freely relative to the action member around a first connecting rod axis parallel to the primary axis.

the connecting rod is attached to the action member using a first pivot link which alone connects the connecting rod to the action member.

the connecting rod is attached to the nut using a second pivot link that connects the connecting rod to the nut, such that the connecting rod rotates freely relative to the nut around a second connecting rod axis parallel to the primary axis and orthogonal to the secondary axis.

the connecting rod forms, with the action member, a first anti-rotation compass to fix the rotation of the nut around the secondary axis relative to the stator.

the second pivot link alone connects the connecting rod to the nut.

the connecting rod comprises two arms positioned in a fork, using which the connecting rod is attached to the nut while rotating freely relative to the nut around the second connecting rod axis, the arms extending on either side of the nut.

the second connecting rod axis and the secondary axis are secant.

the force sensing device comprises a second anti-rotation compass, configured to lock the rotation of the nut relative to the support around the secondary axis, and the connecting rod is attached to the second anti-rotation compass so as to be connected to the nut via the second anti-rotation compass.

the second anti-rotation compass comprises:

a first arm:

that is attached to the nut by a third pivot link, the axis of which is parallel to the primary axis and secant with the secondary axis, such that the first arm rotates freely relative to the nut around the axis of the third pivot link, and that is attached to the connecting rod by the second pivot link, such that the first arm rotates freely relative to the connecting rod around the axis of the second pivot link, and a second arm:

that is attached to the first arm by a fourth pivot link, the axis of which is parallel to the primary axis such that the first arm and the second arm rotate freely relative to one another around the axis of the fourth pivot link, and that is attached to the support by a fifth pivot link, the axis of which is parallel to the primary axis, such that the second arm rotates freely relative to the support around the axis of the fifth pivot link.

the action member is attached to the nut via a pivot link of the force sensing device, which alone connects the action member to the nut, such that the action member rotates freely relative to the nut around a nut axis parallel to the primary axis and orthogonal to the secondary axis.

the stator is securely attached to the support.

the stator is attached to the support while rotating freely around a stator axis relative to the support, the stator axis being parallel to the primary axis.

the screw has two ends via which the screw is attached to a framework of the force sensing device, while rotating freely around the secondary axis relative to the framework, the framework being fastened to the stator, the nut being movable within the framework, between the two ends of the screw, and an integral assembly, comprising the screw, the stator and the framework, has a center of gravity traversed by the stator axis.

the force sensing device comprises a system of rollers and rails blocking the rotation of the nut around the secondary axis relative to the stator.

the rotary device is an electric generator, an electric motor, or a magnetic-rheological device.

The invention also relates to a flight control device of an aircraft, the flight control device comprising a force sensing device as described above, as well as a control member able to be actuated by hand or by foot, and connected in rotation with the action member around the primary axis.

The invention also relates to a method for using a force sensing device as described above, as part of a flight control device of an aircraft.

BRIEF DESCRIPTION OF THE DRAWINGS

The invention will be better understood upon reading the following description, provided solely as a non-limiting example and done in reference to the appended drawings, in which.

DETAILED DESCRIPTION

Figure 1:
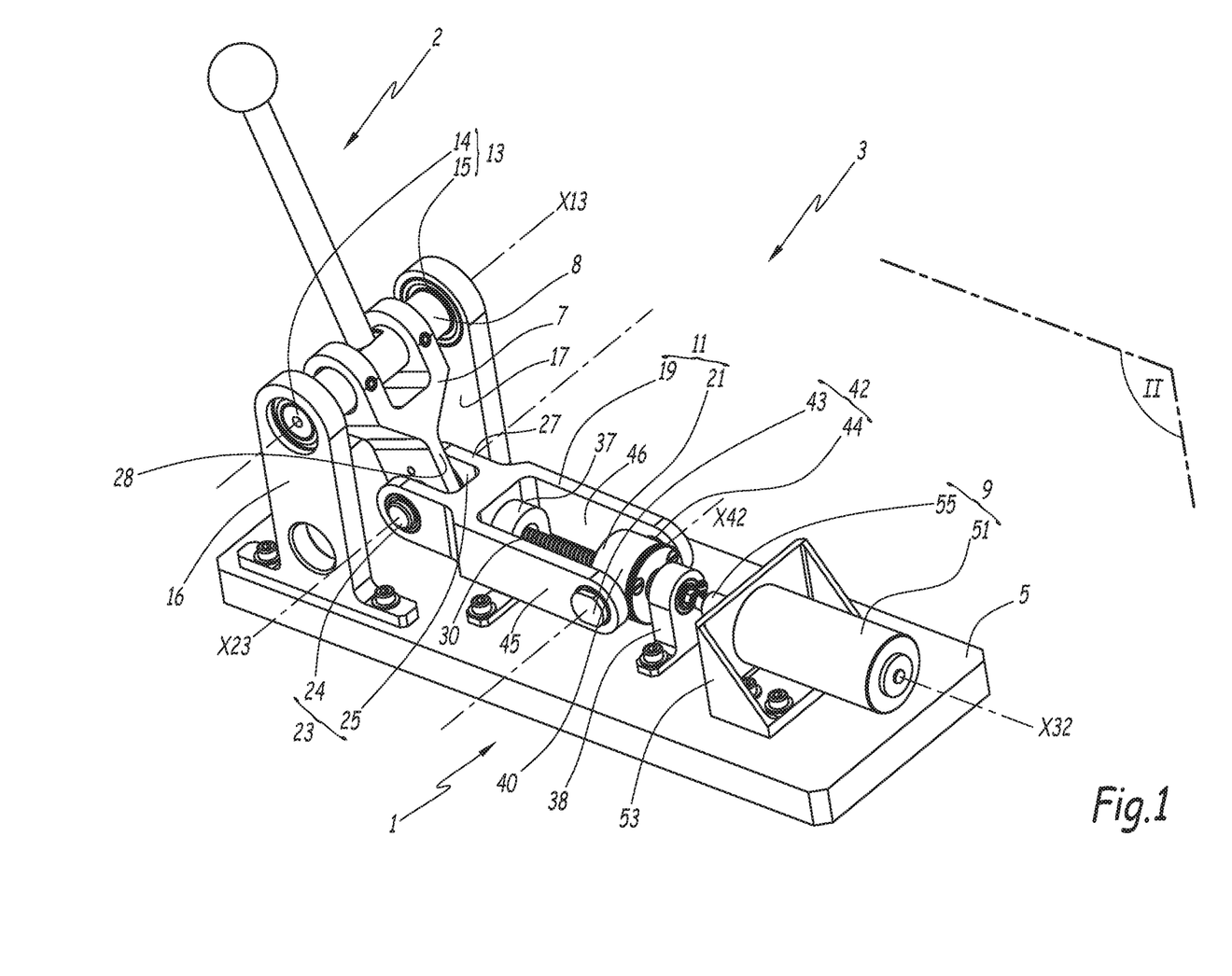
FIG. 1 is a perspective view of a force sensing device for a flight control device of an aircraft according to a first embodiment of the invention.

FIG. 1 shows a first embodiment of a flight control device 3. This flight control device 3 is configured to equip an aircraft, which is not illustrated. For example, the aircraft is an airplane or a helicopter. The flight control device 3 is in particular designed to be integrated into a cockpit of this aircraft, as part of a man-machine interface for piloting the aircraft.

The flight control device 3 comprises a force sensing device 1 and a control member 2. In the case at hand, the member 2 forms a control lever able to be actuated by hand, preferably by a pilot of the aircraft, or by a crew member of the aircraft. Preferably, the flight control device 3 forms the reducing chain of an aircraft mini stick. Alternatively, the control member 2 can be actuated by foot, for example forming a control pedal. The flight control device 3 acts on one or several control surfaces of the aircraft, such as foil flaps or ailerons, or on the orientation of a propeller.

The force sensing device 1 comprises a support 5, an action member 7, a rotary device 9 and a mechanical reducing gear 11.

The support 5 is securely attached to the aircraft, and in particular to the cockpit of the latter.

The action member 7 is attached to the support 5 via a pivot link 13, such that the action member rotates freely around a primary axis X13 relative to the support 5. In the present document, the expression "pivot link" refers to a pivot link that does not slide axially, unless otherwise expressly stated.

In the present example, the action member 7 comprises an axial body 8, which is coaxial with the axis X13, and the support 5 comprises two support arms 16 and 17 extending in planes orthogonal to the axis X13 and separated from one another. The axial body 8 is mounted pivoting on each arm 16 and 17, respectively via two bearings 14 and 15, forming the pivot link 13. The pivot link 13 is thus in two parts, each formed by one of the bearings 14 and 15. The action member 7 extends between the bearings 14 and 15, which guarantees good stability and resistance to the vibrations of this member 7.

The member 7 advantageously has a lever function, inasmuch as it is attached to the support 5 using the pivot link 13 whose axis X13 is stationary relative to the support 5.

In general, for the device 1, it is preferred to use rolling bearings with rolling elements, such as balls or rollers, since they make it possible to obtain no play and a high mechanical efficiency. Preferably, each pivot link of the device 1 comprises at least two bearings with rolling elements with oblique contacts, which are preloaded, for example with elastic washers, to cancel out the radial play of these bearings. Furthermore, for each bearing, it is provided to immobilize the outer ring, for example by gripping, as well as the inner ring, by gripping or sealing.

In general, it is advantageously provided that all of the pivot links of the device 1 are free of frictional contact and are on the contrary in rolling contact, in order to cancel out any play and have a high efficiency, to thus meet the requirements related to the specific field of the flight control device.

Thus, the bearings 14 and 15 preferably have rolling elements, such as ball bearings or roller bearings.

Alternatively, depending on the application, it is possible to provide bearings without rolling.

In the present example, the control member 2 is fixedly attached to the action member 7, and more particularly to the body 8, so as to rotate freely around the primary axis X13, securely with the action member 7. Alternatively, the control member 2 further controls degrees of freedom relative to the action member 7, but is nevertheless connected to the latter in rotation around the axis X13.

The mechanical reducing gear 11 comprises a connecting rod 19 and a screw-nut system 21.

The connecting rod 19 is attached to the action member 7 via a pivot link 23, while rotating freely relative to the member 7 around a connecting rod axis X23, parallel to the axis X13. Preferably, only the pivot link 23 connects the connecting rod 19 to the member 7, no additional link or intermediate member being provided.

The connecting rod 19 comprises two parallel support arms 26 and 27, positioned in a fork, extending in a plane orthogonal to the axis X23. The member 7 comprises an arm 28 securely fastened to the body 8, the arm 28 extending in a plane orthogonal to the axis X13, between the bearings 14 and 15 and between the arms 26 and 27. The arms 26 and 27 respectively carry bearings 24 and 25, each forming part of the pivot link 23. The two parts 24 and 25 of the pivot link 23 are therefore distributed along the axis X23 on either side of the member 7, which gives the device 1 good stability and a certain resistance to vibrations. The member 7, the link 23 and the connecting rod 19 also together provide an anti-rotation compass function, while functionally keeping a connecting rod axis X42, described below, parallel to the axis X13.

The system 21 has rolling elements, such as balls, which reduces the play while making it possible to obtain a high efficiency, which is particularly advantageous relative to a traditional gear train. Preferably, the screw-nut system 21 is a standard commercially available ball-screw, such that it is relatively inexpensive.

The use of a system 21 with balls with elliptical tracks and reduced play is preferably chosen. Alternatively, a system 21 with balls with diamond-shaped tracks is used, with four contacts, to cancel out the axial play. Alternatively, a system 21 is chosen with standard play, which is less expensive, and whose play remains much lower than in a traditional gear train reducing gear.

The screw-nut system 21 has a pitch that is preferably comprised between 0.6 mm and 7.5 mm, and is for example equal to 2 mm.

The system 21 comprises a nut 40, which is attached to the connecting rod 19 via a pivot link 42, so as to rotate freely around a connecting rod axis X42 relative to the connecting rod 19. The axis X42 is parallel to the axes X13 and X23. Preferably, only the pivot link 42 connects the connecting rod 19 to the nut 40, no other link or intermediate member being provided to connect the connecting rod 19 to the nut 40. The axes X42 and X32 are secant; i.e., intersect, and are orthogonal. The connecting rod 19 comprises two arms 45 and 46, parallel to one another, extending in planes orthogonal to the axis X42 and remote, so as to be positioned in a fork on either side of the nut 40. The arms 45 and 46 extend in the opposite direction of the arms 26 and 27. The arms 45 and 46 respectively carry bearings 43 and 44, which from the pivot link 42, and using which the connecting rod 19 is attached to the nut 40. Thus, the connecting rod 19 connects the member 7 to the nut 40.

Figure 2:
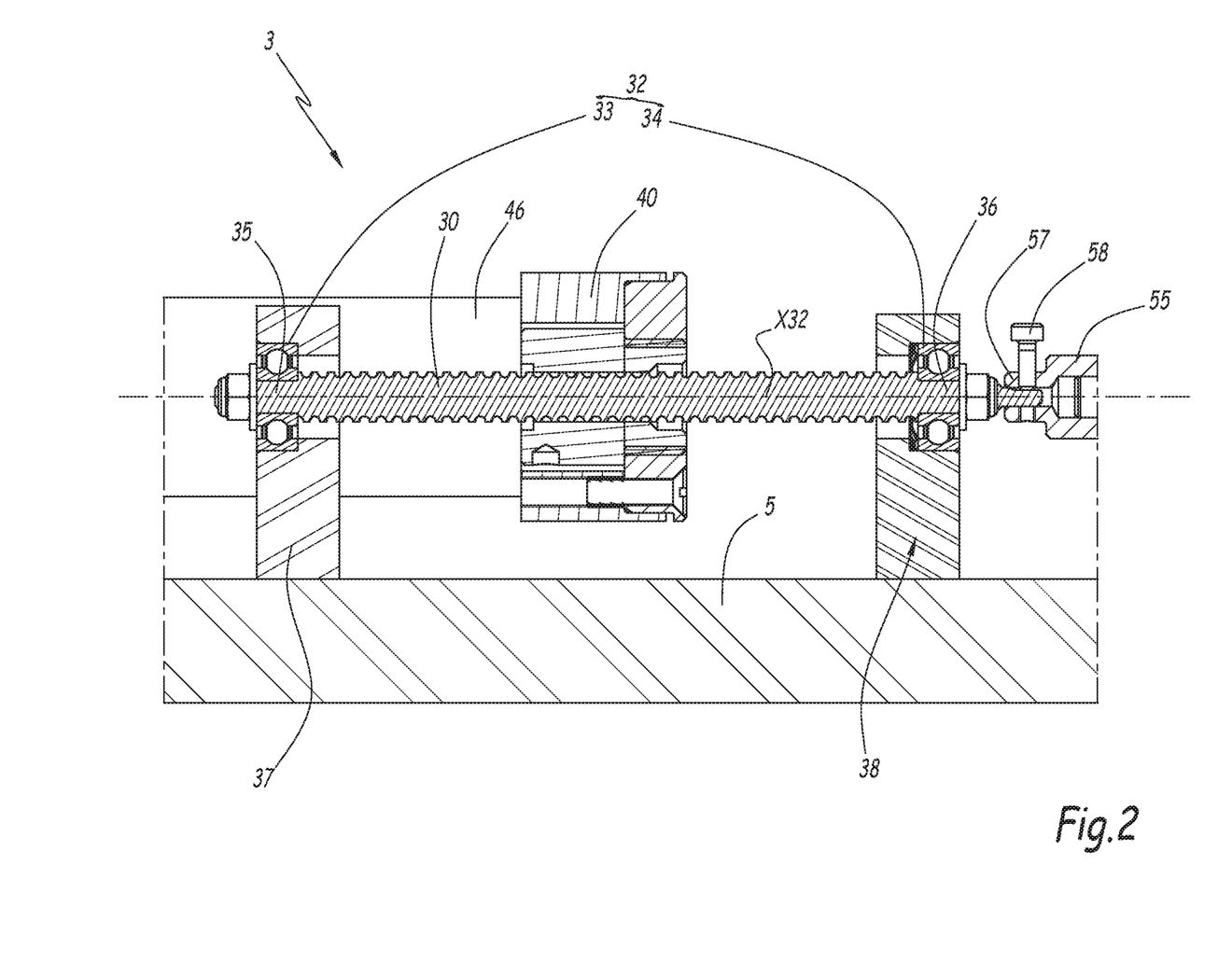
FIG. 2 is a sectional view along a plane II-II of a detail of the flight control device of FIG. 1.

The system 21 comprises a screw 30, which is attached to the support 5 by a pivot link 32, so as to rotate freely around a secondary axis X32 relative to the support 5. In the present example, the support 5 comprises arms 37 and 38 parallel to one another, extending in planes orthogonal to the axis X32 and spaced apart along this axis X32. As shown in FIG. 2, the screw 30 has ends 35 and 36 that are respectively supported by the arms 37 and 38, via bearings 33 and 34.

If the device 9 is passive or semi-active, as described below, in particular if only a damping torque is exerted, the bearings 33 and 34 preferably have oblique contact arranged in an "O", so as to react the radial and axial forces exerted on the screw 30, without buckling by the latter. Owing to this arrangement, the axial forces are still applied in traction on the screw 30 if the device 9 is passive or semi-active. Lastly, this "O" arrangement ensures better rigidity of the swivel points of the screw 30, which also makes it possible to improve the buckling behavior in case of an active device 9, as described below.

The bearings 33 and 34 thus form two parts of the pivot link 32. The axis X32 is orthoradial to the axis X13; i.e., it extends in a plane orthogonal to the axis X13 without meeting the latter.

The arms 45 and 46 of the connecting rod 19 extend along the screw 30, on either side of the latter, and are connected to one another near its end 35, in the extension of the screw 30. The connecting rod 19 is thus oriented in a direction that is close or has a small incline relative to the screw 30, such that the forces circulating between the screw 30 and the connecting rod 19 via the nut 40, as described below, are substantially in the axis of the screw 30, or have a small incline relative to the screw 30. The device 1 is thus particularly resistant to vibrations.

The nut 40 is both connected to the support 5 in rotation around the axis X32, via the connecting rod 19 and the member 7, and helically with the screw 30, along and around the axis X32, via rolling elements. The pivot links 13, 23 and 42 therefore have an anti-rotation function of the nut 40 around the axis X32. The rolling elements of the system 21 are preferably contained in the nut 40. The transmission of the movement between the nut 40 and the screw 30 is done exquisitely using these rolling elements. This transmission is therefore done exclusively by non-frictional rolling contact, to meet the specific requirements of the field of the flight control device. The system 21 is reversible, i.e., actuating the nut 40 drives the screw 30, and vice versa. In particular, the nut 40, while being translated along the axis X32, rotates the screw 30 via rolling elements. The screw 30, when rotated around the axis X32, translates the nut 40 along the axis X32.

The connecting rod 19 can be described as connecting rod, advantageously inasmuch as it is not directly connected to the support 5 and it comprises two pivot links 23 and 42, the axes of which are not stationary relative to the support 5, these axes preferably being parallel. The lever 2 has a so-called "neutral" orientation around the axis X13 relative to the support 5, and two extreme positions for example separated by 20° (degrees) relative to the neutral orientation. In the present example, when the lever 2 is in the neutral orientation, the member 7 is perpendicular and secant with the axis X32, the connecting rod 19 extends in a plane parallel to the axis X32, and the member 7 is perpendicular to the connecting rod 19. Thus, when the member 7 is oriented separated from this neutral position, as illustrated in FIG. 1, the incline of the connecting rod relative to the axis X32 is very small, for example several degrees. Thus, the forces circulating between the connecting rod 19 and the nut 40 are parallel or quasi-parallel to the axis X23, irrespective of the orientation of the lever 2 between its two extreme orientations.

The rotary device 9 comprises a stator 51, which is securely attached to the support 5, via a bracket 53. At the least, the stator 51 is attached to the support while being connected in rotation to the latter around the axis X32, such that the nut 40 is fixed in rotation around the axis X32 relative to the stator 51.

The device 9 also comprises a rotor 55, which extends coaxially with the axis X32 and which is connected in rotation with the screw 30 around the axis X32, or even fastened to the screw 30, by a coupling system 57 with radial tightening screws 58, visible in FIG. 2. The rotor 55 is attached to the stator 51 while rotating freely relative to the stator 51 around the axis X32.

Generally, the device 9 is configured to apply a force sensing torque on the rotor 55 relative to the stator 51, around the axis X32. This force sensing torque, when applied, is felt by the pilot when he manipulates the control member 2, through the reducing gear 11 and the action member 7. Thus, the rotary device 9 can be qualified as device generating the force sensation.

The device 9 can be an electric motor, for example brushless and with a permanent magnet. In this case, the electric motor is preferably a four working quadrant motor. The device 9 comprises electrical phases, contained in the stator 51 and interacting with the magnet. The phases and the magnet form electromagnetic means for applying the force sensing torque, the operation of which depends on an outside electrical energy supply, applied to the phases. In this case, the device 9 is an active element of the device 1. Advantageously, a piloted device, not illustrated, is provided for supplying electrical energy to the device 9, to control and vary, as desired, the value of the force sensing torque applied on the rotor 55, for example as a function of the angular position of the member 7 relative to the support 5, or as a function of other parameters or phenomena occurring on the aircraft.

Alternatively, the device 9 can be an electrical generator, formed by an electric motor similar to that described above, but not supplied with electrical energy. In this case, the device 9 is a passive element of the device 1, which does not require an outside energy supply to operate, and which produces a damping torque substantially proportional to the rotation speed of the rotor 55 relative to the stator 51. To that end, the phases of the generator are connected to one another by resistances with a relatively low value.

The main advantage of using a brushless device, whether the device 9 is active or passive, is that this device needs very little upkeep and benefits from a long lifetime without wearing out. Furthermore, the use of the brushless device decreases the friction value. Another type of electric motor or electric generator may, however, be used depending on the application.

It is also possible to provide a semi-active device 9, formed by a rotary device with magnetic-rheological powder. This type of device on the one hand comprises a fluid comprising a mixture of a magnetic powder and a rheological fluid matrix, and on the other hand comprises means for applying a magnetic field on this fluid. Depending on the applied magnetic field, the fluid changes viscosity and applies, on the rotor 55, a friction value, which can be varied by varying the magnetic field, or deactivating the magnetic field. Depending on the applied friction value, a torque may be applied on the rotor 55 relative to the stator 51. In the case of a rotary device with magnetic-rheological powder, the force sensing torque applied therefore corresponds to a damping torque whose value can be controlled as a function of an electrical energy applied on the device. For example, this torque can be comprised between 0.2 N.m (Newton meter), without electrical energy, and 20 N.m, when a maximum electrical energy value is applied.

Alternatively, the device 9 may comprise any means capable of applying an appropriate force sensing torque, as a function of the application of the device 1. It is in particular possible to provide mechanical passive devices, such as a device with hydraulic damping.

The mechanical reducing gear 11 connects the rotation of the member 7 with the rotation of the rotor 55 with a reduction ratio that in particular depends on the value of the pitch of the screw-nut system 21, the distance separating the axes X13 and X23, the distance separating the axes X23 and X42, and the angular position of the member 7 relative to the neutral orientation. Preferably, the reduction ratio is comprised between 50 and 200. More preferably, the reduction ratio is provided to be comprised between 60 and 160.

Alternatively, to still further reduce the play in the device 1, one provides, in place of the nut 40, a carriage including two nuts helically connected to the screw 30, the carriage being attached to the connecting rod 19 via a pivot link similar to the link 42. The two nuts are axially wedged relative to one another, for example using preloaded washers, to completely cancel out the play between the nuts and the screw.

Preferably, the member 7 does not comprise more links than the aforementioned links 13 and 23.

Preferably, the connecting rod 19 does not comprise more links than the aforementioned links 23 and 42.

Preferably, the nut 40 does not comprise more links than the aforementioned link 42 and the link with the nut 30.

One obtains an anti-rotation compass when, cumulatively: a lever, here the member 7, is connected to a support, here the support 5, by a first pivot link, here the link 13; a connecting rod, here the connecting rod 19, is connected to the lever by a second pivot link, here the link 23, around an axis parallel to that of the first pivot link, the axis of the second pivot link being rotatable around the axis of the first pivot link relative to the support; and the connecting rod includes a third pivot link, here the link 42, around an axis parallel to the axes of the first and second pivot links, the third pivot link being provided to be attached to a subsequent element, here the nut 40, of which one wishes to prevent the rotation around an axis perpendicular to the axes of the three aforementioned pivot links, here the axis X32.

In the present embodiment, the implementation of a connecting rod with arms positioned in a fork is advantageous for rigidity and compactness reasons. However, it is possible to consider a connecting rod without a fork in order to simplify the force sensing device and make it less expensive.

Figure 3:
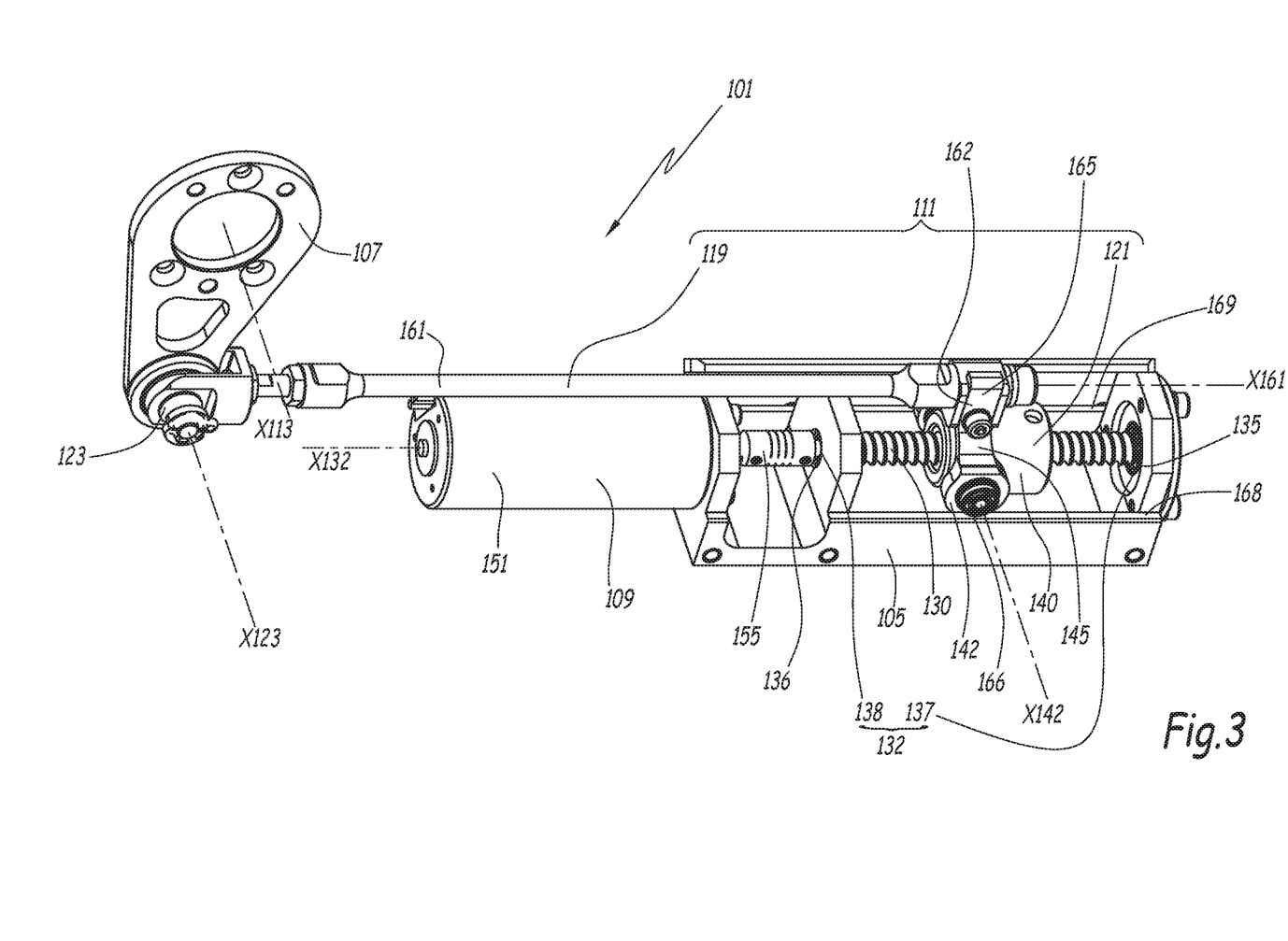
FIGS. 3 and 4 are two perspective views from different angles, of a force sensing device for a flight control device of an aircraft, according to a second embodiment of the invention.
Figure 4:
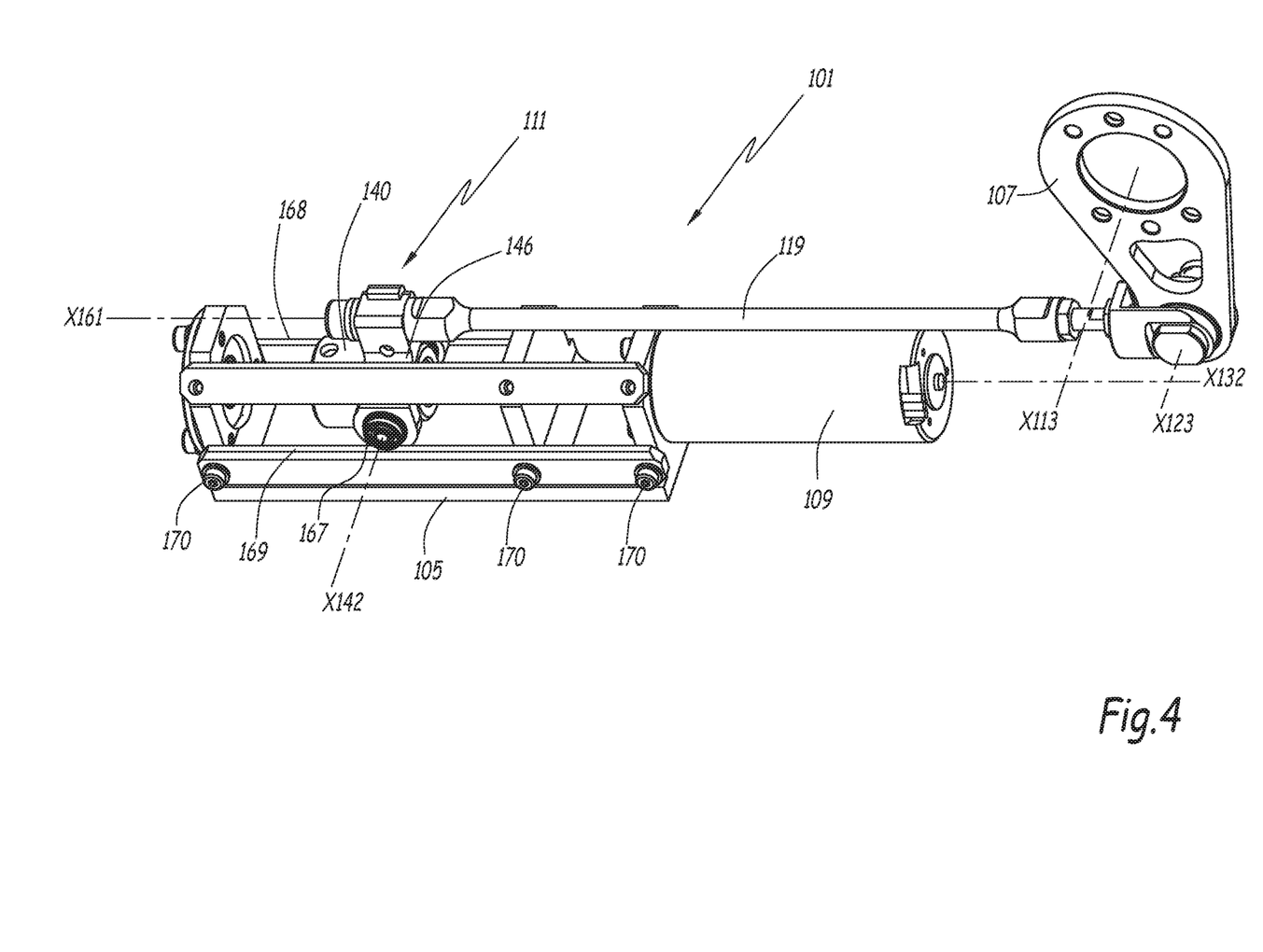

FIGS. 3 and 4 illustrate a force sensing device 101 according to a second embodiment, which has features similar to those of the device 1 of the first embodiment illustrated in FIGS. 1 and 2. The features similar to the first and second embodiments are designated by reference numbers increased by 100 for the force sensing device 101, relative to the force sensing device 1.

The force sensing device 101 is designed to equip an aircraft, within a flight control device. Preferably, the device 101 is integrated into an aircraft control device while forming equipment of the mini stick type. The device 101 comprises a support 105, an action member 107, which is attached to the support 105 while rotating freely around a primary axis X113. The link between the support 105 and the action member 107 is not illustrated. This non-illustrated link is advantageously a pivot link around the axis X113. The device 101 also comprises a rotary device 109, comprising a stator 151, which is securely attached to the support 105, and a rotor 155, which is attached to the stator 151 while rotating freely relative to the stator 151 around a secondary axis X132. The device 109 comprises a means for applying a force sensing torque on the rotation of the rotor 155 relative to the stator 151 around the secondary axis X132, this means preferably being contained in the stator 151.

The device 101 also comprises a mechanical reducing gear 111, which, with a reduction ratio, links the rotation of the action member 107 relative to the support 105 around the primary axis X113, with the rotation of the rotor 155 relative to the stator 151 around the secondary axis X132.

More specifically, the mechanical reducing gear comprises a connecting rod 119 and a screw-nut system 121 with rolling elements, the system 121 comprising a screw 130, which is attached to the rotor 155 at one end 136 of the screw 130. The screw 130 rotates with the rotor 155 around the secondary axis X132 by its end 136. The screw 130 is also attached to the support 105 using a pivot link 132, comprising a first part 137 supporting one end 135 of the screw 130, opposite the end 136, and a second part 138 supporting the end 136. The stator 151 is fastened to the support 105 via the part 138 and is thus situated at the end 136 of the screw 130.

The system 121 comprises a nut 140 containing the rolling elements of the system 121. The nut 140 is helically connected with the screw 130 around and along the secondary axis X132, via rolling elements.

The connecting rod 119 links the action member 107 to the nut 140, while being attached to the action member 107 by a pivot link 123 and to the nut 140 by a pivot link 142. Thus, the connecting rod 119 rotates freely relative to the action member 107, around an axis X123 of the link 123, the axis X123 being parallel to the axis X113, and is freely rotating relative to the nut 140 around an axis X142 of the link 142, the axis X142 being parallel to the axis X113. The axis X142 and the axis X132 are secant and orthogonal.

The connecting rod 119 of the device 101 is generally L-shaped, and includes a part 161 and a part 162. The part 161 connects the link 123 to the part 162, and the part 162 connects the part 161 to the link 142. The part 162 comprises two arms 145 and 146 that extend in a horseshoe, on either side of the nut 140, from the axis X142. Each arm 145 and 146 bears a part of the link 142, each part of this link 142 being a bearing with rolling elements coaxial with the axis X142. The part 162 also comprises a core 165 securely connecting the arms 145 and 146 to one another. The part 162 of the connecting rod 119 of the device 101 thus extends radially relative to the nut 140 and its axis X132, while the arms 45 and 46 of the connecting rod 19 of the device 1 extend along the axis X32.

The part 161 is securely fastened to the part 162 via the core 165 and extends along an axis X161, which, when the member 107 is in a neutral orientation relative to the support 105, is substantially parallel and not combined with the axis X132. The axis X161 is orthogonal to the axis X123 and intersects this axis X123, while sharing a common plane with the axis X132. Thus, at the core 165, the connecting rod 119 forms a bend, preferably at a right angle.

The part 161 has a length, along the axis X161, measured from the core 165 to the axis X123, which is significantly greater, for example at least three times greater, than the length separating the axis X142 from the core 165, measured in the plane defined by the axes X161 and X132. The length of the aforementioned part 161 is also significantly greater, for example at least three times greater, than that of the distance separating the axes X113 and X123. The high ratio between the length of the part 161 and the other two aforementioned lengths makes it possible to ensure that the member 107, during its rotation around the axis X113 relative to the support 105, imparts a smaller rotation to the connecting rod 119 around the axis X142, such that the axis X161 remains as close as possible to parallel with the axis X132. This ratio of lengths makes it possible to contain the linearity of the selected reduction ratio; i.e., to have this reduction ratio be practically constant, irrespective of the orientation of the action member 107.

For space saving reasons, the part 161 of the connecting rod 119 of the device 101, from the core 165, extends from the side of the end 136 of the screw 130, while the connecting rod 19 of the device 1 on the contrary extends from the side of the end 35 of the screw 30.

The device 101 also comprises means for locking the rotation of the nut 140 around the secondary axis X132 relative to the stator 151. In the present example, these means comprise two rollers 166 and 167 attached to the nut 140 or to the part 162 of the connecting rod 119, while being distributed on either side of the nut 140 coaxially with the axis X142. The rollers 166 and 167 rotate freely relative to the nut 140 and relative to the connecting rod 119. In the case at hand, the rollers 166 and 167 are each connected to the nut 140 or to the connecting rod 119 via a bearing with rolling elements. The rotational connecting means of the nut 140 also comprise guide rails 168 and 169, along and against which the rollers 166 and 167 are configured to roll during the movement of the nut 140 along the axis X132. The guide rails 168 and 169 extend parallel to, and at a distance from, the axis X132, and respectively form two rolling strips, for example planar, for the rollers 166 and 167. The rails 168 and 169 are securely attached to the support 105. The position and the orientation of at least one of the rails 168 and 169 is preferably adjustable using set screws. In the present example, three screws 170 illustrated in FIG. 4 make it possible to adjust the rail 169. By adjusting the screws 170, one adjusts the play and/or the friction that may exist between the rollers 166 and 167 and the rails 168 and 169, respectively. The interaction of the rollers 166 and 167 with the rails 168 and 169 forms a system that blocks the rotation of the nut 140 around the axis X132 relative to the support 105 and the stator 151.

Alternatively, depending on the application, it is possible to implement any appropriate means for blocking the rotation of the nut 140 around the axis X132 relative to the stator 151.

Preferably, the member 107 does not comprise more degrees of freedom relative to the support 105 than its degree of rotational freedom around the axis X113, and is not connected by a link other than the aforementioned link 123, and then any link giving the member 107 its degree of rotational freedom relative to the support 105 around the axis X113.

Preferably, the connecting rod 119 does not comprise more links than the links 123 and 142, and the rotational locking means provided by the rollers 166 and 167.

Preferably, the nut 140 does not comprise more links than the link 142, than the link with the screw 130 and than the rotational locking means provided by the rollers 166 and 167.

In the embodiment of FIGS. 3 and 4, one also obtains an anti-rotation compass, since, cumulatively: a lever, here the member 107, is connected to a support, here the support 105, by a first pivot link, here a link not shown around the axis X113; a connecting rod, here the connecting rod 119, is connected to the lever by a second pivot link, here the link 123, around an axis parallel to that of the first pivot link, here the axis X123, the axis of the second pivot link being rotatable around the axis of the first pivot link relative to the support; and the connecting rod includes a third pivot link, here the link 142, around an axis parallel to the axes of the first and second pivot links, the third pivot link being provided to be attached to a subsequent element, here the nut 140, of which one wishes to prevent the rotation around an axis perpendicular to the axes of the three aforementioned pivot links, here the axis X132.

Figure 5:
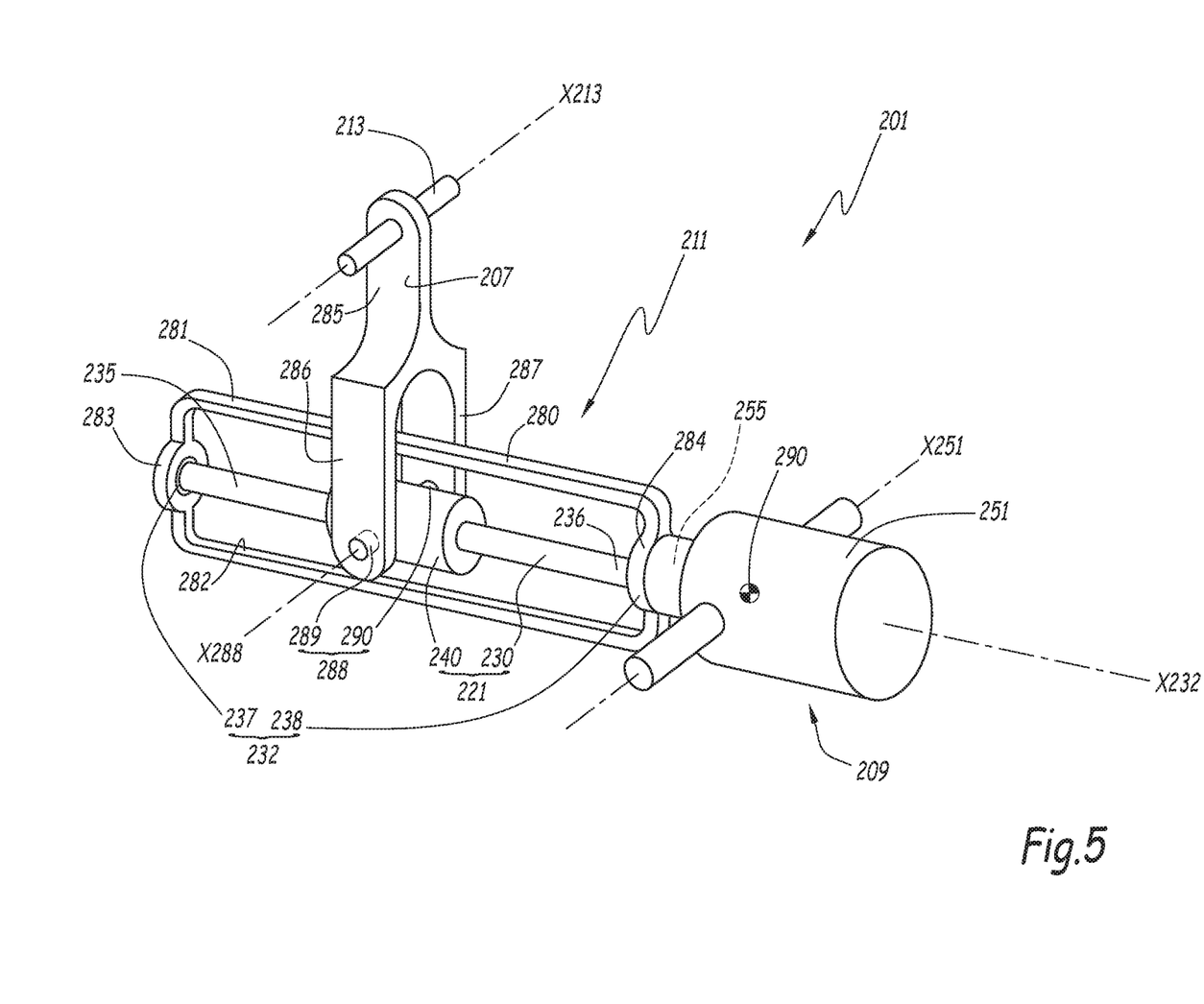
FIG. 5 is a perspective view of a force sensing device for a flight control device of an aircraft, according to a third embodiment of the invention.

FIG. 5 illustrates a force sensing device 201 according to a third embodiment, which has features similar to those of the device 1 of the first embodiment illustrated in FIGS. 1 and 2. The features similar to the first and third embodiments are designated by reference numbers increased by 200 for the force sensing device 201, relative to the force sensing device 1.

The force sensing device 201 is designed to equip an aircraft, within a flight control device. Preferably, the device 201 is integrated into an aircraft control device while forming equipment of the damping housing or motor housing type, mounted in parallel with a mechanical flight control chain. The device 201 comprises a support, not illustrated, as well as an action member 207, which is attached to the support while rotating freely around a primary axis X213, via a pivot link 213, only the shaft of which is shown. To that end, a pivot link, not illustrated, is preferably provided, connecting the member 207 to the support. The pivot link for example comprises one or several bearings with rolling elements.

The device 201 also comprises a rotary device 209, comprising a stator 251, and a rotor 255, hidden by the stator 251 in FIG. 5. The rotor 255 of the device 201 is attached to the stator 251 while rotating freely relative to the stator 251 around a secondary axis X232. The device 209 also comprises a means for applying a force sensing torque for the rotation of the rotor 255 relative to the stator 251 around the secondary axis X232.

In this third embodiment, the stator 251 is attached to the support of the device 201 while rotating freely, around a stator axis X251, relative to said support. To that end, a pivot link, not illustrated, is preferably provided, connecting the stator 251 to the support. The pivot link for example comprises one or several bearings with rolling elements. The stator 251 is therefore not stationary relative to the support, and may on the contrary pivot freely around the axis X251. In this configuration, the stator 251 is nevertheless connected in rotation to the support around a secondary axis X232. The axis X251 is parallel to the axis X213.

Depending on the application, it is provided that the device 209 is active, passive, or semi-active, according to the previous definitions.

The device 201 comprises a mechanical reducing gear 211, which, with a reduction ratio, links the rotation of the action member 207 relative to the support around the axis X213, with the rotation of the rotor 255 relative to the stator 251, around the secondary axis X232.

The mechanical reducing gear 211 comprises a screw-nut system 221 with rolling elements, which in turn comprises a screw 230, a nut 240, as well as rolling elements, not visible in FIG. 5, that are contained in the nut 240.

The screw 230 has two ends 235 and 236, and is attached to the rotor 255 by its end 236 so as to be connected in rotation to the rotor 255 around the secondary axis X232. The device 201 comprises a framework or cartridge 280, which is securely attached to the stator 251.

In the present example, the framework 280 forms a frame. The framework 280 comprises two branches 281 and 282, which extend parallel to the axis X232, on either side of this axis X232, over a length extending from one end 235 to the other end 236 of the screw 230. The framework 280 comprises two parallel branches 283 and 284, extending perpendicular to the axis X232 and respectively being positioned at the ends 235 and 236 of the screw 230. Each branch 283 and 284 connects the branches 281 and 282 to one another to form a rigid frame. The framework 280 is securely attached to the stator 251 via the branch 284. The screw 230 traverses the branch 284 to be attached to the rotor 255.

The screw 230 is attached to the framework 280 via a pivot link 232 comprising two parts 237 and 238, respectively attached to the branches 283 and 284. Preferably, each part 237 and 238 is formed by a bearing with rolling elements.

The stator 251 and the framework 280 thus form a secured assembly, freely rotating around the axis X251 relative to the support. Consequently, the rotor 255 and the screw 230 also rotate freely around the axis X251 relative to the support, securely with that assembly. Preferably, in order to limit the unwanted vibration phenomena within the device 201, the axis X251; i.e., the pivot link connecting the stator 251 to the support, is positioned such that this axis X251 traverses a center of gravity 290 of the assembly comprising the framework 280, the stator 251 and the screw 230. Optionally, it is possible to adapt the assembly comprising the action member 207 and the nut 240 to place the center of gravity of this assembly on the rotation axis X213, which also makes it possible to limit the unwanted vibration phenomena.

In the case illustrated in FIG. 5, the center of gravity 290 is located at the meeting point of the axes X251 and X232, such that the axes X251 and X232 are secant.

Alternatively, the axes X251 and X232 are secant, even if the axis X251 does not traverse the center of gravity 290.

The nut 240 is helically connected with the screw around and along the axis X232, via rolling elements of the system 221. The nut 240 is movable between the ends 235 and 236, following a translational movement along the axis X232, concomitant with the rotation of the screw 230 around the axis X232. Thus, the nut 240 is movable within the framework 280, between the branches 281, 282, 283 and 284.

The action member 207 comprises a main body 285, as well as two arms 286 and 287 that are parallel and positioned in a fork. The action member 207 is attached to the support of the device 201 via the main body 285, which is traversed by the axis X213. The arms 286 and 287 are securely attached to the main body while respectively extending in two orthogonal planes relative to the axis X213. The nut 240 and the branch 281 of the framework 280 are positioned between the two arms 286 and 287. In other words, the arms 286 and 287 form a fork around the nut 240 while being positioned on either side of the latter.

In this third embodiment, the nut 240 is attached to the member 207 via a single pivot link 288 of the device 201, so as to rotate freely relative to the member 207 around a nut axis X288. "A single pivot link" means that aside from the link 288, there is no additional link or intermediate member such as a connecting rod, using which the member 207 is attached to the nut 240. The link 288 therefore alone connects the nut 240 to the member 207. The axis X288 is parallel to the axis X213 and to the axis X251 and is orthogonal to the axis X232. The axes X288 and X232 are secant. The pivot link 288 comprises two coaxial parts 289 and 290, respectively mounted on the arms 286 and 287. Each part 289 and 290 preferably comprises a bearing with rolling elements.

The link 288 performs a locking function of the rotation of the nut 240 around the axis X232 relative to the stator 251.

In the device 201, unlike the devices 1 and 101, it is not necessary to provide a connecting rod to connect the member 207 to the nut 240, such that the device 201 is both compact and easy to produce. Indeed, only the pivot link 288 is necessary to connect the member 207 to the nut 240, this link 288 allowing a relative rotation of the nut 240 and the member 207. This is made possible owing to the possibility given to the stator 251 to pivot around the axis X251 relative to the support.

In a neutral orientation relative to the support, the member 207 is preferably perpendicular to the axis X232.

Preferably, the action member 407 does not comprise more links than the aforementioned links 213 and 288.

Preferably, the nut 240 does not comprise more links than aforementioned the link 288 and link with the screw 230.

Preferably, the stator 251 does not comprise more degrees of freedom relative to the support than its degree of rotational freedom around the axis X251.

Figure 6:
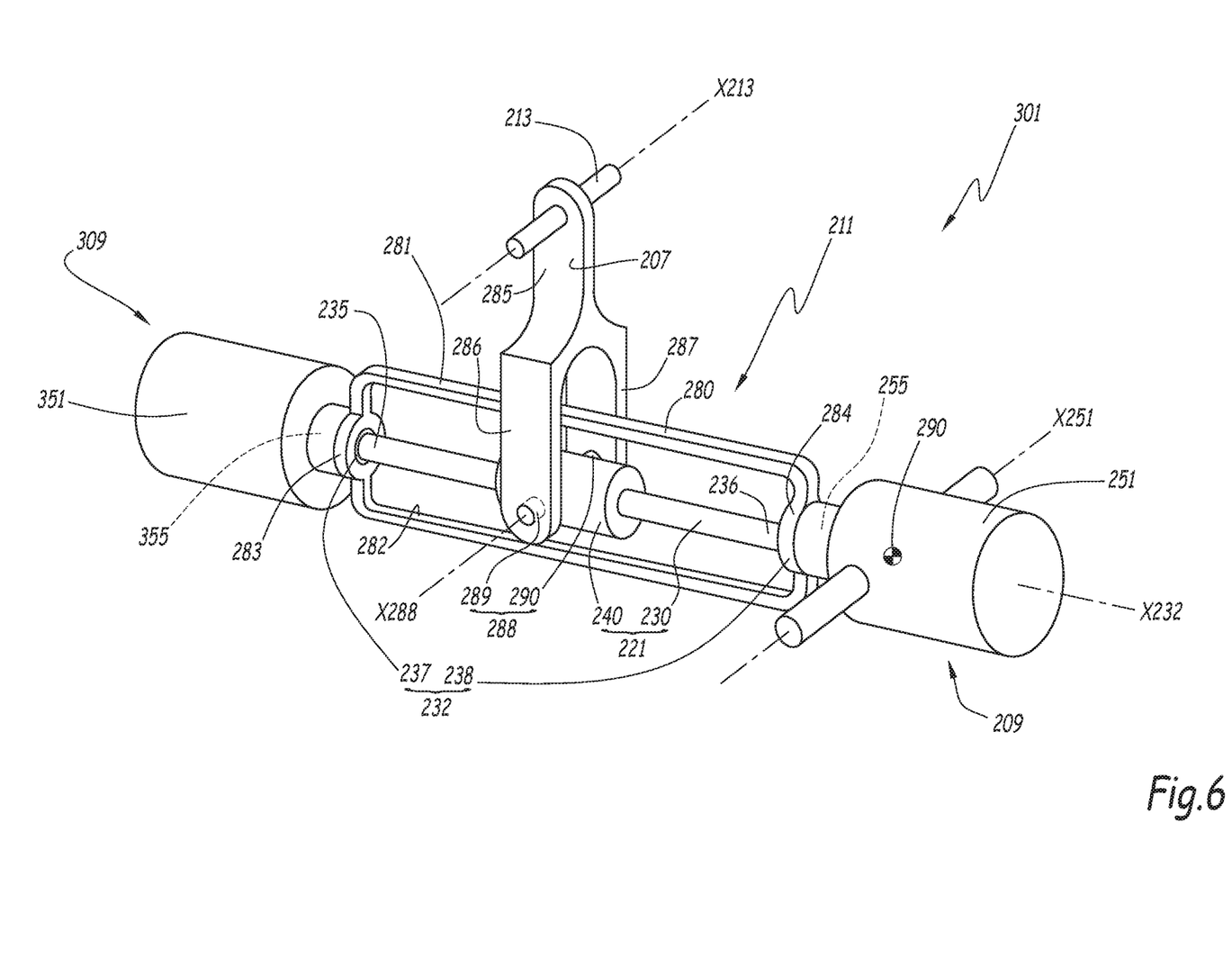
FIG. 6 is a view similar to FIG. 5 of a force sensing device for a flight control device of an aircraft, according to a fourth embodiment of the invention.

In the fourth embodiment of FIG. 6, the device 301, which is also similar in all points to the device 201 of the embodiment of FIG. 5, further comprises a rotary device 309, in addition to the rotary device 209 already provided for the embodiment of FIG. 5. The rotary device 309 comprises a stator 351 and a rotor 355, hidden by the stator 351 in FIG. 6. The rotor 355 is attached to the stator 351 while rotating freely relative to the stator 351 around the axis X232. The rotor 355 is also connected in rotation with the screw 230 around the axis X232, via the end 235; i.e., opposite the rotor 255 relative to the screw 230. The stator 351 is fastened to the branch 283 of the framework 280; i.e., opposite the stator 251 relative to the framework 280. The device 309 also comprises a means for applying a force sensing torque for the rotation of the rotor 355 relative to the stator 251 around the axis X232. Thus, the device 309 is complementary to the device 209, in that they both apply a force sensing torque on the screw 230.

Figure 7:
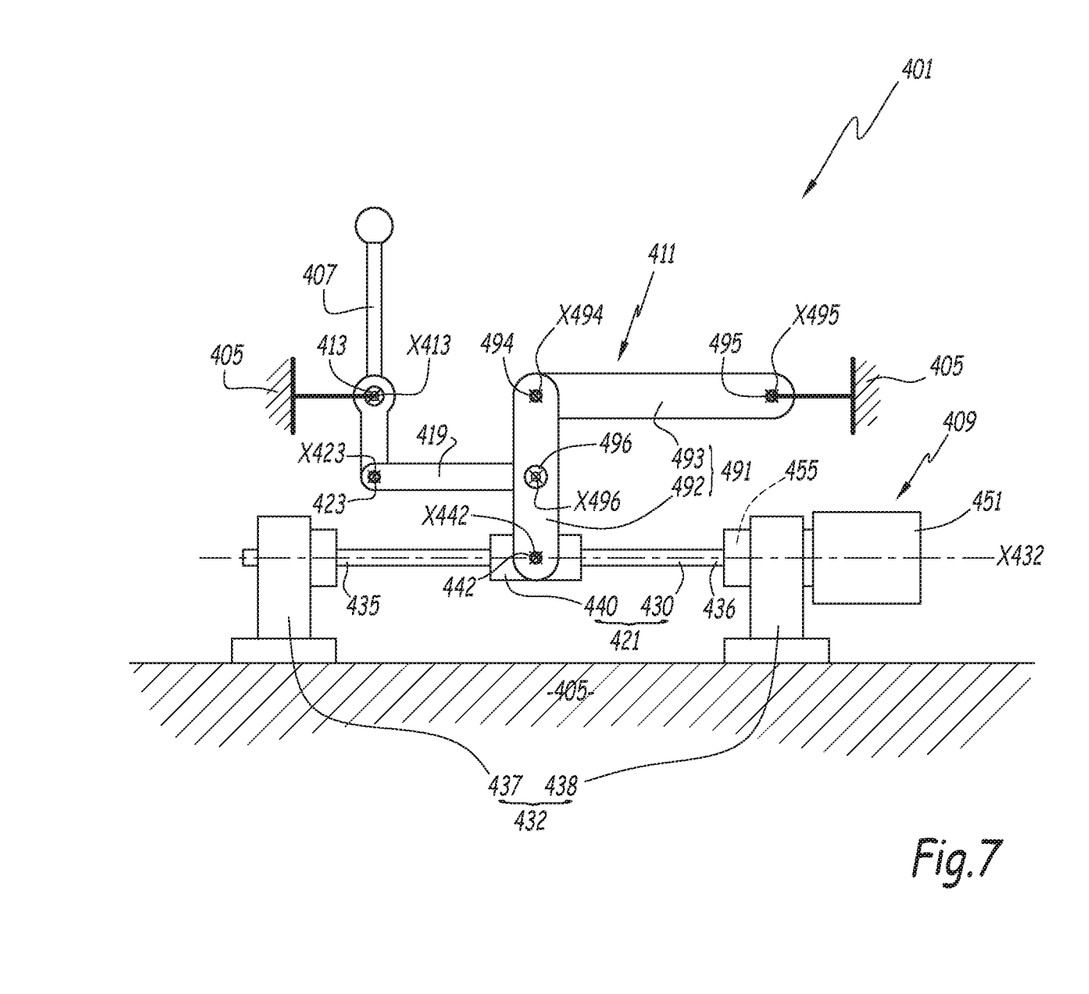
FIG. 7 is a side view of a force sensing device for a flight control device of an aircraft, according to a fifth embodiment of the invention.

FIG. 7 illustrates a force sensing device 401 according to a fifth embodiment, which has features similar to those of the device 1 of the first embodiment illustrated in FIGS. 1 and 2. The features similar to the first and fifth embodiments are designated by reference numbers increased by 400 for the force sensing device 401, relative to the force sensing device 1.

The force sensing device 401 is designed to equip an aircraft, within a flight control device. Preferably, the device 401 is integrated into an aircraft control device while forming equipment of the mini stick type.

FIG. 7 is a schematic illustration of the device 401, which is meant to illustrate only the features of the kinematics of this device 401. The shape of the various parts of the device 401 can be adapted as a function of the actual application that will be made of this device 401, in particular how these parts will withstand the mechanical stresses and any other stress that they experience.

The device 401 comprises a support 405 and an action member 407, which is attached to the support 405 while rotating freely around a primary axis X413, via a pivot link 413.

The device 401 also comprises a rotary device 409, comprising a stator 451, which is securely attached to the support 405, and a rotor 455, which is attached to the stator 451 while rotating freely relative to the stator 451 around a secondary axis X432. The device 409 comprises a means for applying a force sensing torque on the rotation of the rotor 455 relative to the stator 451 around the secondary axis X432, this means preferably being contained in the stator 451.

The device 401 also comprises a mechanical reducing gear 411, which, with a reduction ratio, links the rotation of the action member 407 relative to the support 405 around the primary axis X413, with the rotation of the rotor 455 relative to the stator 451 around the secondary axis X432.

More specifically, the mechanical reducing gear comprises a connecting rod 419, an anti-rotation compass 491 and a screw-nut system 421 with rolling elements, the system 421 comprising a screw 430, which is attached to the rotor 455 at one end 436 of the screw 430. The screw 430 rotates with the rotor 455 around the secondary axis X432 by its end 436. The screw 430 is also attached to the support 405 using a pivot link 432, comprising a first part 437 supporting one end 435 of the screw 430, opposite the end 436, and a second part 438 supporting the end 436. The stator 451 is fastened to the support 405 via the part 438 and is thus situated at the end 436 of the screw 430.

The system 421 comprises a nut 440 containing the rolling elements of the system 421. The nut 440 is helically connected with the screw 430 around and along the secondary axis X432, via rolling elements.

The action member 407 is connected to the nut 440 via the connecting rod 419, which is attached to the action member by a pivot link 423, and via the compass 491, which is attached to the nut 440 by a pivot link 442. Thus, the connecting rod 419 rotates freely relative to the action member 407, around an axis X423 of the pivot link 423, the axis X423 being parallel to the axis X413.

The compass 491 comprises an arm 492 and an arm 493, connected to one another by a pivot link 494, the axis X494 of which is parallel to the axis X413, so as to rotate freely relative to one another around this axis X413. The link 494 is situated at a first end of the arm 492 and a first end of the arm 493. The arm 493 is also connected to the support 405 by a pivot link 495, the axis X495 of which is parallel to the axis X494, and therefore to the axis X413. Thus, the arm 493 rotates freely relative to the support 405 around the axis X495. The link 495 is situated at a second end of the arm 493, opposite the aforementioned first end of this arm 493. The axes X413 and X495 are preferably situated equidistantly from the axis X432, while being positioned on the same side of this axis X432 in a plane orthogonal to the axis X413.

The pivot link 442 is situated at a second end of the arm 492, opposite the aforementioned first end of this arm 492. The arm 492 is therefore connected to the nut 440 via the link 442, while rotating freely relative to this nut 440 around an axis X442 of the link 442. The axis X442 is parallel to the axis X494 and the axis X413. The axis X442 and the axis X432 are provided to be secant and orthogonal.

The connecting rod 419 is connected to the arm 492 by a pivot link 496, so as to rotate freely relative to the arm 492 around an axis X496 of the link 496, parallel to the axis X423 and therefore to the axis X413. The links 423 and 496 are situated at opposite ends of the connecting rod 419. The link 496 is situated between the links 494 and 442 on the arm 492, preferably equidistantly.

In this embodiment, the locking of the rotation of the nut 440 relative to the support 405, around the axis X432, is done using the compass 491.

The connecting rod 419, as well as the arms 492 and 493 of the device 401, each have a rectilinear or longitudinal shape. When the member 407 is oriented perpendicular to the screw 430, which is preferably the case when the flight control device is in neutral, as is the case in FIG. 7, the connecting rod 419 is parallel to the screw 430. In this situation, the arm 492 is perpendicular to the screw 430 and the connecting rod 419. In this situation, the arm 493 is parallel to the screw 430 and the connecting rod 419. In this situation, the nut 440 is situated midway between the ends 435 and 436 of the screw 430.

The arm 492 including the pivot links 442, 494 and 496, the respective axis of which is mobile relative to the support 405, and not including any pivot link whose axis is stationary relative to the support 405, the arm 492 can be considered a connecting rod. The arm 493 can be considered a lever, since it includes a pivot link 495 whose axis is stationary relative to the support 405.

In the present embodiment, the implementation of a connecting rod with arms positioned in a fork is advantageous for rigidity and compactness reasons. However, it is possible to consider a connecting rod without a fork in order to simplify the force sensing device and make it less expensive. During operation, when the member 407 is pivoted around the axis X413, the anti-rotation compass 491 serves to compensate for the linearity defects of the transmission, via the connecting rod 419, of the action of the member 407 to the nut 440. To that end, a variation occurs in the orientation of the arm 493 relative to the support 405, albeit relatively small in light of the variation of the orientation of the member 407. Owing to this configuration, the member 407 can be pivoted over a relatively large angular sector around the axis X413, from its neutral orientation, without major variation in the reduction ratio between the orientation of the member 407 and the position of the nut 440 relative to the support 405.

Furthermore, in the case of FIG. 7, the connecting rod 419 is situated parallel to the screw 430, and not at the height of the latter, as is the case for the embodiment of FIGS. 1 and 2, such that the design of the connecting rod 419 is simplified. In particular, it is not necessary to provide an H or fork shape including very long arms, like the arms 45 and 46 of the embodiment of FIGS. 1 and 2.

The compass 491 serving to prevent rotation of the nut 440 around the axis X432 relative to the support 405, the stresses related to the rotational tendency of the nut 440 are transmitted little or not at all to the connecting rod 419, the work of which is exclusively or quasi-exclusively in traction or compression between its only two pivot links 423 and 496. The arm 492 in turn works exclusively or quasi-exclusively in flexion.

Alternatively, the length ratios between the various links 423, 442, 494, 495 and 496 are adapted to the application, as well as their position relative to the support 405 and relative to one another.

Preferably, the distance between the links 423 and 496 is equal to the distance between the links 494 and 495 and the distance between the links 494 and 442, measured in the plane of FIG. 7, orthogonal to the axis X413.

Preferably, the member 407 does not comprise more links than the aforementioned links 413 and 423.

Preferably, the connecting rod 419 does not comprise more links than the aforementioned links 423 and 496.

Preferably, the compass 491 does not comprise more links than the aforementioned links 442, 494, 495 and 496.

Preferably, the nut 440 does not comprise more links than aforementioned the link 442 and link with the screw 30.

Preferably, the links 413, 423, 496, 494 and 495 are positioned on a same side relative to the axis X432 and not on either side of this axis X432.

In the embodiment of FIG. 7, the arm 493 constitutes the lever of the anti-rotation compass 491, since the arm 493 is connected to the support 405 by the link 495. The arm 492 constitutes the connecting rod of the anti-rotation compass

491, while being connected to the arm 493 by the link 494. The nut 440 constitutes the subsequent element whose rotation is prevented by the compass 491, since it is attached to the link 442 of the arm 492, which is the third pivot link of the anti-return compass 491.

In the embodiment of FIG. 7, an anti-rotation compass other than the anti-rotation compass 491 is obtained: indeed, the member 407, attached by the pivot link 413 to the support 405, constitutes the lever of the compass, while the connecting rod 419 constitutes the connecting rod of the compass, since the connecting rod 419 is attached to the member 407 via the pivot link 423 and is attached to a subsequent element, the arm 492, via a third pivot link 496.

In the embodiments of FIGS. 1-4 and 7, the nut 40, 140 or 440 of the mechanical reducing gear is prevented from rotating around the secondary axis X32, X132 or X432 while being directly attached to an anti-rotation compass, via the third pivot link 42, 142 or 442 of this anti-rotation compass, with no other intermediary.

The features of each embodiment and the alternatives defined above can be applied to all of the embodiments and alternatives defined above, as long as it is technically possible to do so.

The invention claimed is:

1. A force sensing device for a flight control device for an aircraft, the force sensing device comprising:
   a support,
   an action member, which is attached to the support while rotating freely around a primary axis,
   a rotary device, comprising a stator, which is attached to the support while being rotatably connected to the support around a secondary axis, and a rotor, which is attached to the stator while rotating freely relative to the stator around the secondary axis, the rotary device being designed to apply a force sensing torque on the rotor, relative to the stator, around the secondary axis, and
   a mechanical reducing gear, which, with a reduction ratio, links the rotation of the action member relative to the support around the primary axis, with the rotation of the rotor relative to the stator around the secondary axis, and which comprises a screw-nut system with rolling elements, the screw-nut system comprising:
   a screw, which is attached to the rotor while being connected in rotation to the rotor around the secondary axis, and
   a nut, which is fixed in rotation around the secondary axis relative to the stator and which is helically connected with the screw around and along the secondary axis, via the rolling elements.

2. The force sensing device according to claim 1, wherein the mechanical reducing gear comprises a connecting rod connecting the action member to the nut, the connecting rod being attached to the action member such that the connecting rod rotates freely relative to the action member around a first connecting rod axis parallel to the primary axis.

3. The force sensing device according to claim 2, wherein the connecting rod is attached to the action member using a first pivot link which alone connects the connecting rod to the action member.

4. The force sensing device according to claim 2, wherein the connecting rod is attached to the nut using a second pivot link that connects the connecting rod to the nut, such that the connecting rod rotates freely relative to the nut around a second connecting rod axis parallel to the primary axis and orthogonal to the secondary axis.

5. The force sensing device according to claim 4, wherein the connecting rod forms, with the action member, a first anti-rotation compass to fix the rotation of the nut around the secondary axis relative to the stator.

6. The force sensing device according to claim 4, wherein the second pivot link alone connects the connecting rod to the nut.

7. The force sensing device according to claim 4, wherein the connecting rod comprises two arms positioned in a fork, using which the connecting rod is attached to the nut while rotating freely relative to the nut around the second connecting rod axis, the arms extending on either side of the nut.

8. The force sensing device according to claim 4, wherein the second connecting rod axis and the secondary axis are secant.

9. The force sensing device according to claim 2, wherein the force sensing device comprises a second anti-rotation compass, configured to lock the rotation of the nut relative to the support around the secondary axis, and wherein the connecting rod is attached to the second anti-rotation compass so as to be connected to the nut via the second anti-rotation compass.

10. The force sensing device according to claim 9, wherein the second anti-rotation compass comprises:
    a first arm that is attached to the nut by a third pivot link, the axis of which is parallel to the primary axis and secant with the secondary axis, such that the first arm rotates freely relative to the nut around the axis of the third pivot link, and that is attached to the connecting rod by the second pivot link, such that the first arm rotates freely relative to the connecting rod around the axis of the second pivot link; and
    a second arm that is attached to the first arm by a fourth pivot link, the axis of which is parallel to the primary axis such that the first arm and the second arm rotate freely relative to one another around the axis of the fourth pivot link, and that is attached to the support by a fifth pivot link, the axis of which is parallel to the primary axis, such that the second arm rotates freely relative to the support around the axis of the fifth pivot link.

11. The force sensing device according to claim 1, wherein the action member is attached to the nut via a pivot link of the force sensing device, which alone connects the action member to the nut, such that the action member rotates freely relative to the nut around a nut axis parallel to the primary axis and orthogonal to the secondary axis.

12. The force sensing device according to claim 1, wherein the stator is securely attached to the support.

13. The force sensing device according to claim 1, wherein the stator is attached to the support while rotating freely around a stator axis relative to the support, the stator axis being parallel to the primary axis.

14. The force sensing device according to claim 13, wherein the screw has two ends via which the screw is attached to a framework of the force sensing device, while rotating freely around the secondary axis relative to the framework, the framework being fastened to the stator, the nut being movable within the framework, between the two ends of the screw, and wherein an integral assembly, comprising the screw, the stator and the framework, has a center of gravity traversed by the stator axis.

15. The force sensing device according to claim 1, wherein the force sensing device comprises a system of rollers and rails blocking the rotation of the nut around the secondary axis relative to the stator.

16. The force sensing device according to claim 1, wherein the rotary device is an electric generator, an electric motor, or a magnetic-rheological device.

17. A flight control device of an aircraft, the flight control device comprising a force sensing device according to claim 1, as well as a control member able to be actuated by hand or by foot, and connected in rotation with the action member around the primary axis.

\* \* \* \* \*